United States Patent
Oh (10) Patent No.: US 12,181,051 B2
(45) Date of Patent: Dec. 31, 2024

(54) VOLUME CONTROL ACTUATOR INCLUDING NON-CONTACT CYLINDER

(71) Applicant: SEOUL INDUSTRY ENGINEERING CO., LTD., Namyangju-si (KR)

(72) Inventor: Sang Taek Oh, Namyangju-si (KR)

(73) Assignee: SEOUL INDUSTRY ENGINEERING CO., LTD., Namyangju-si (KR)

( * ) Notice: Subject to any disclaimer, the term of this patent is extended or adjusted under 35 U.S.C. 154(b) by 147 days.

(21) Appl. No.: 17/901,889

(22) Filed: Sep. 2, 2022

(65) Prior Publication Data

US 2024/0035569 A1 Feb. 1, 2024

(30) Foreign Application Priority Data

Aug. 1, 2022 (KR) .................. 10-2022-0095608

(51) Int. Cl.
*F16J 3/04* (2006.01)
(52) U.S. Cl.
CPC ............. *F16J 3/04* (2013.01); *F05C 2225/02* (2013.01)
(58) Field of Classification Search
CPC ........................................................ F16J 3/04
USPC ....................................................... 222/181.1
See application file for complete search history.

(56) References Cited

U.S. PATENT DOCUMENTS 7,284,970 B2 * 10/2007 Nishio ................ F04B 43/0063
138/30

FOREIGN PATENT DOCUMENTS

JP     2000231856 A  *  8/2000
KR     101449047 B1    10/2014

OTHER PUBLICATIONS

Machine Translation of JP2000231856 (Aug. 2000) found within the NPL Miyohsi.*
English Abstract of KR10-1449047.

* cited by examiner

*Primary Examiner* — Kenneth Bomberg
*Assistant Examiner* — Daniel S Collins
(74) *Attorney, Agent, or Firm* — You & IP, LLC (57) ABSTRACT

A volume control actuator including a non-contact cylinder. An installation frame has a predetermined height and size. First and second installation spaces are defined in upper and lower portions of the installation frame, respectively. A pressing unit is vertically disposed on top of the installation frame to move a reciprocating rod in the first installation space reciprocating stroke movements. A fluid pipe is provided in the second installation space and connected to an installation plate to obtain a path through which fluid flows. Both ends of a rubber cylinder are fixed to a top surface of the installation plate and one end of the reciprocating rod. The rubber cylinder is provided in the first installation space so that the volume of the rubber cylinder changes in an expanding and contracting manner in response to the stroking of the reciprocating rod, thereby causing fluid in the fluid pipe to flow.

6 Claims, 6 Drawing Sheets

VOLUME CONTROL ACTUATOR INCLUDING NON-CONTACT CYLINDER

CROSS REFERENCE TO RELATED APPLICATION

This application claims priority from Korean Patent Application No. 10-2022-0095608, filed on Aug. 1, 2022, which is hereby incorporated by reference for all purposes as if fully set forth herein.

BACKGROUND

Field

The present disclosure relates to a volume control actuator including a non-contact cylinder and, more particularly, to a volume control actuator including a non-contact cylinder, the volume control actuator being configured to perform pumping by changes in the volume thereof without contact resistance, thereby improving durability of a product and increasing longevity thereof.

Description

In general, an actuator is a general term used for a prime mover using electricity, hydraulic pressure, compressed air, or the like, and is generally referred to as a device performing mechanical work using fluid energy. Such an actuator is widely used as a high-performance device that is lightweight and has a small size and a slim profile, as well as a device that requires precise control.

A reciprocating piston pump used in such an actuator may include: an inlet through which liquid enters a pump; an inlet valve preventing liquid from flowing backwards at the inlet; an outlet through which liquid is discharged from the pump; an outlet pump preventing liquid from flowing backwards at the outlet; a pump cylinder forming a space inside the pump such that liquid is contained in the space; a piston reducing and increasing the space so that liquid enters and exits the inside of the pump cylinder; a sealing member provided to prevent liquid from leaking from between the pump cylinder and the piston; a liquid injection barrel injecting liquid to reduce friction of a sealing guide and the sealing member; and a pumping driving unit by which the piston can reciprocate.

The reciprocating piston pump is configured such that, when the volume inside the pump cylinder is increased, the liquid enters the inside of the pump through the inlet valve, and when the volume inside the pump cylinder is reduced, liquid exits the inside of the pump through the outlet valve. In a conventional reciprocating piston pump, a material used for airtight sealing is worn by reciprocating movement and the friction of the piston and the pump cylinder. After a predetermined number of operations, the airtight seal material should be replaced with a new material as a consumable.

Thus, with increases in product production capacity of equipment and increases in the number of operations, replacement cycles of related consumables are gradually being reduced. In some production lines, consumables should be replaced weekly or biweekly, depending on the production ability of equipment.

In other words, in a structure, such as the reciprocating piston pump, in which the piston reciprocates through friction of the sealing member while sealing is provided to prevent liquid from leaking from between the pump cylinder and the piston, the replacement cycles of consumables should be increased by further smoothing friction surfaces of the piston and the sealing member or selecting a material having less frictional force and abrasion for the sealing member.

However, in a structure in which there is friction between materials during operation, there is a limit to increasing the longevity of consumables several times or more by machining contact surfaces and changing the members.

In addition, as more frequent replacement is required, the operation of equipment may be stopped more frequently, thereby reducing a replacement cycle in which a mechanic replaces a consumable. There are problems in that manufacturers may suffer losses, such as increased costs for consumables, increased time during which equipment is suspended, and increased labor costs.

In addition, there are a number of components to be taken apart, such as a sealing member and a sealing guide, during the replacement of consumables, and there are a number of components to be replaced or handled, such as in an operation of injecting lubricant into a liquid injection barrel. In the operating of fitting the sealing member and the sealing guide, the sealing member may be damaged or may not be tightly fitted in a predetermined position. In such a situation, the situation may vary depending on the skill of mechanics, and the ease of replacement or maintenance may be impaired, which is problematic.

In particular, according to Patent Document 1, a bellows is formed of a resin material, in which an incompressible indirect medium formed of a liquid, such as oil, for maintaining pressure in the bellows in order to prevent the bellows from being excessively deformed.

That is, a structure for pumping a small amount of fluid is disclosed. When fluid is used, deformation occurs when compressing the fluid. In order to compensate for the deformation, the bellows should be filled with an incompressible medium for 48 hours or more.

In addition, there may be a problem in that a configuration having a complicated structure may be required to apply the incompressible indirect medium into the bellows, thereby increasing fabrication costs and the price of a product.

Furthermore, a reciprocating piston pump has a drawback in that, during reciprocation of the reciprocating piston pump, foreign matter may be formed by the friction of a seal material and be introduced into fluid. This structure may be disadvantageous for pumping a medical liquid or a liquid, such as chemical fluid, used for the maintenance of purity.

Due to the improved production capability of a conventional battery fabrication process, replacement cycles of consumables for related equipment are reduced, thereby causing the operation of the equipment to be stopped at an earlier time and consumables to be replaced within a shorter period of time. Accordingly, there is a demand for a product able to overcome such problems.

The information disclosed in the Background section is only provided for a better understanding of the background and should not be taken as an acknowledgment or any form of suggestion that this information forms prior art that would already be known to a person having ordinary skill in the art.

Related Art Document

Patent Document 1: Korean Patent No. 10-1449047

BRIEF SUMMARY

Various aspects of the present disclosure provide a volume control actuator including a non-contact cylinder. The cylinder is formed of a rubber material, and thus the volume control actuator may perform pumping by changes in the volume thereof without contact resistance, thereby improving durability of a product and increasing longevity thereof.

According to an aspect, provided is a volume control actuator including a non-contact cylinder. The volume control actuator may include: an installation frame having a predetermined height and a predetermined size, with a first installation space and a second installation space being defined in upper and lower portions of the installation frame, respectively; a pressing unit vertically disposed on top of the installation frame to move a reciprocating rod in the first installation space by reciprocating stroke movements; a fluid pipe provided in the second installation space and connected to an installation plate to obtain a path through which fluid flows; and a rubber cylinder having both ends fixed to a top surface of the installation plate and one end of the reciprocating rod, wherein the rubber cylinder is provided in the first installation space so that the volume of the rubber cylinder changes in an expanding and contracting manner in response to the stroking of the reciprocating rod, thereby causing fluid in the fluid pipe to flow.

The rubber cylinder may include: a bellows formed of a rubber material to change the volume thereof in an expanding and contracting manner in response to the stroking of the reciprocating rod, thereby causing fluid in the fluid pipe to flow; an upper joint connecting the end of the reciprocating rod and a top end of the bellows to transfer reciprocating movement of the reciprocating rod, which protrudes from and retracts into the pressing unit, to the bellows; and a lower joint connecting the top surface of the installation plate and a bottom end of the bellows, thereby fixing the bottom end of the bellows to the installation plate.

The upper joint may include: a disk-shaped connecting plate including a fastening socket formed in a central portion of the connecting plate to be fastened to the end of the reciprocating rod and a plurality of fastening holes formed in a peripheral portion of the connecting plate to be flange-coupled by fastening members; and an upper coupling ring having a plurality of fastening holes corresponding to the fastening holes of the connecting plate to tightly hold a flange formed on the top end of the bellows. The lower coupling ring may be in tight contact with and integrally coupled to the flange of the bellows by the fastening members extending through and fastened to the fastening holes.

The lower joint may include: a plurality of fastening holes formed around the fluid pipe connected to the installation plate to be flange-coupled by the fastening members; and a lower coupling ring configured to tightly hold a flange therein, the flange being provided on the bottom end of the bellows. The lower coupling ring may be in tight contact with and integrally coupled to the flange of the bellows by the fastening members extending through and fastened to the fastening holes.

The installation plate may further include a check valve by which fluid is allowed to flow in a single direction through the fluid pipe.

According to the present disclosure as set forth above, it is possible to perform pumping by changes in volume without contact resistance, thereby improving durability of a product and increasing longevity thereof.

DESCRIPTION OF DRAWINGS

The above and other objectives, features, and advantages of the present disclosure will be more clearly understood from the following detailed description, taken in conjunction with the accompanying drawings, in which.

DETAILED DESCRIPTION

Hereinafter, reference will be made to example embodiments of the present disclosure in detail, which are illustrated in the accompanying drawings and described below, so that a person having ordinary skill in the art to which the present disclosure relates could easily practice the embodiments of the present disclosure.

As illustrated in FIGS. 1 to 6, a volume control actuator including a non-contact cylinder according to the present disclosure may include an installation frame 100, a pressing unit 200, a fluid pipe 300, and a rubber cylinder 400. The volume control actuator may obtain improved pumping performance by changing the volume thereof without contact resistance.

Figure 1:
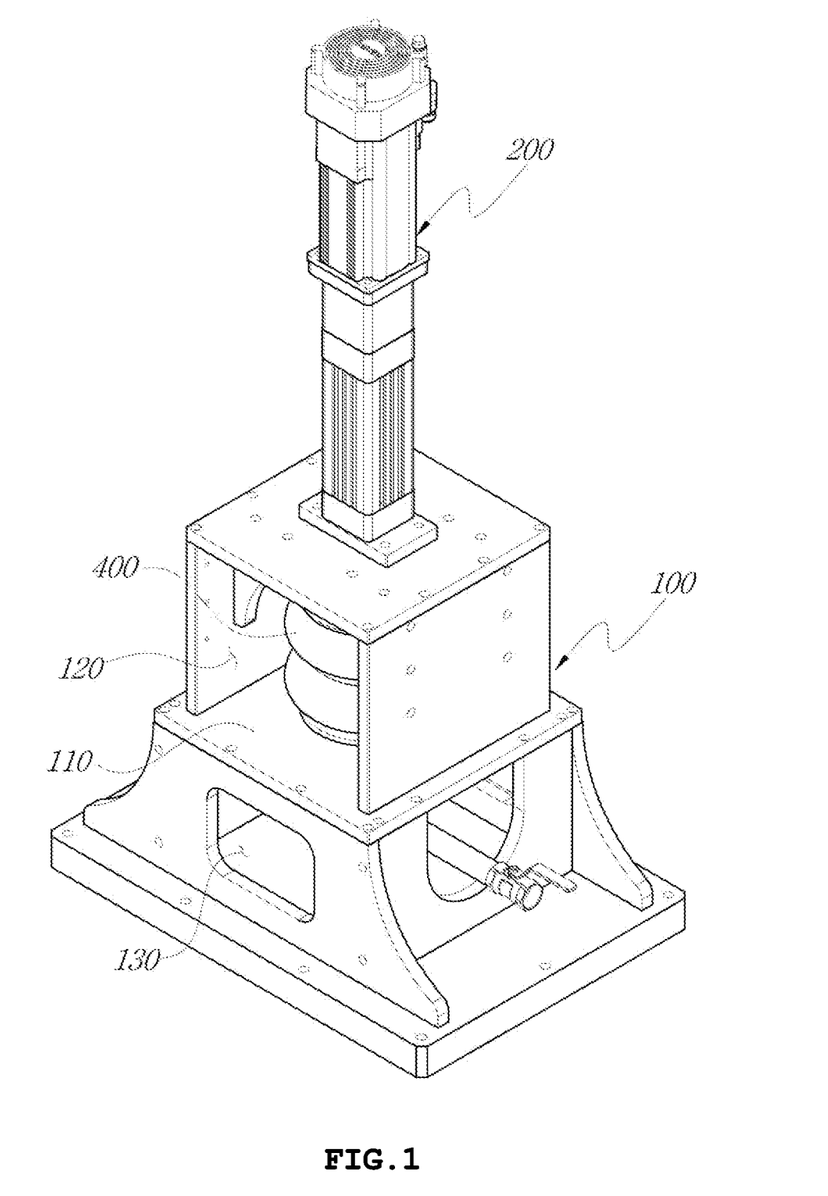
FIG. 1 is a perspective view illustrating a volume control actuator including a non-contact cylinder according to the present disclosure.
Figure 2:
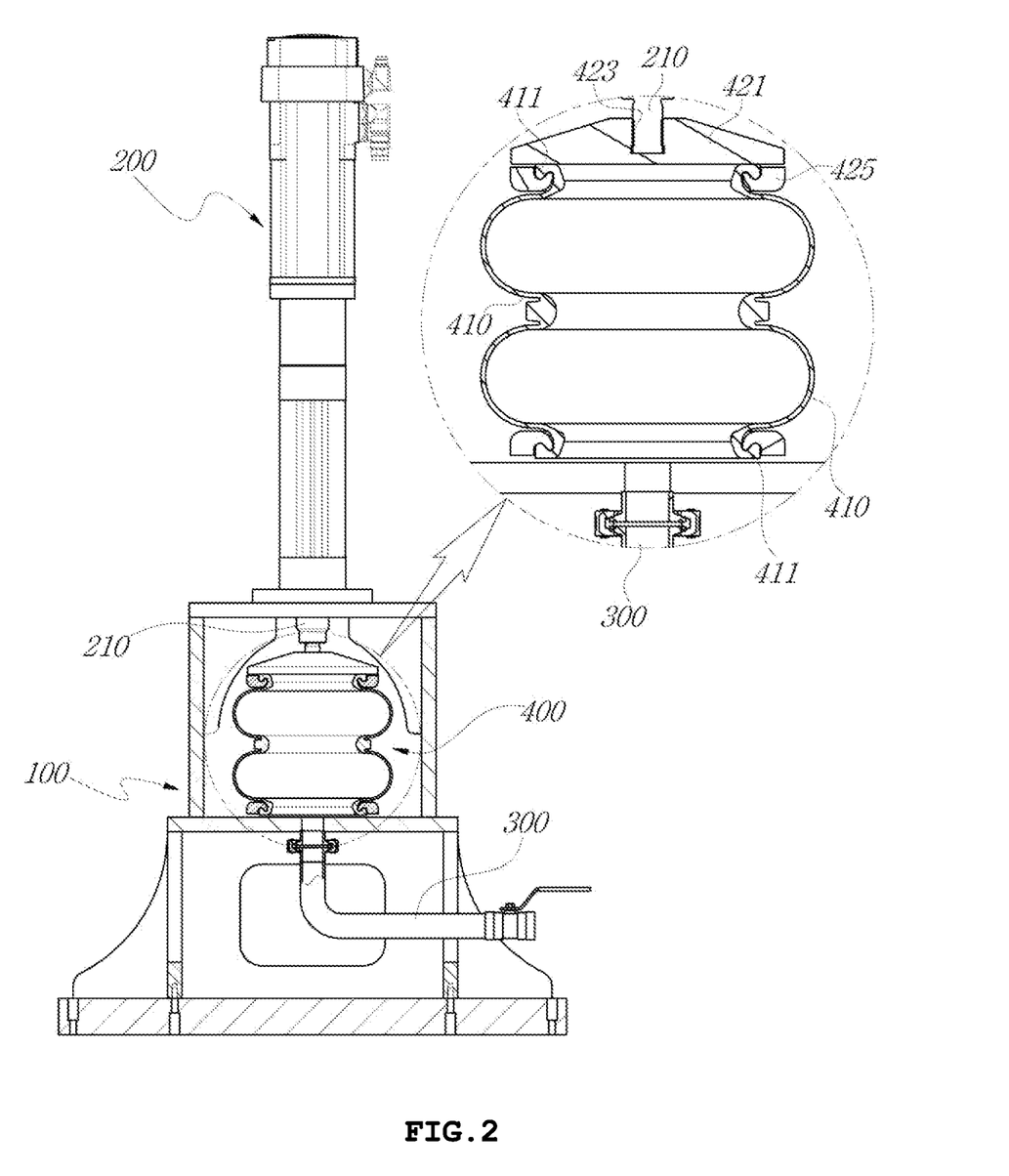
FIG. 2 is a cross-sectional view illustrating the volume control actuator including a non-contact cylinder according to the present disclosure.
Figure 4:
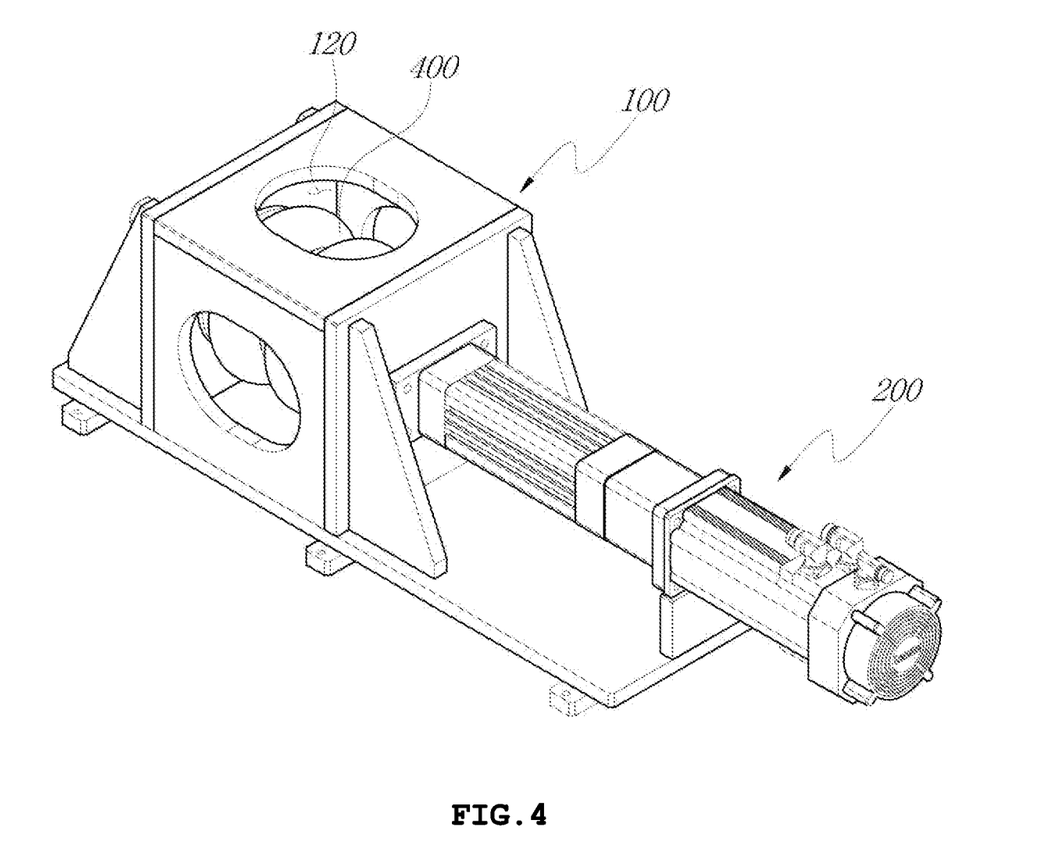
FIG. 4 is a perspective view illustrating another embodiment of the volume control actuator including a non-contact cylinder according to the present disclosure.
Figure 5:
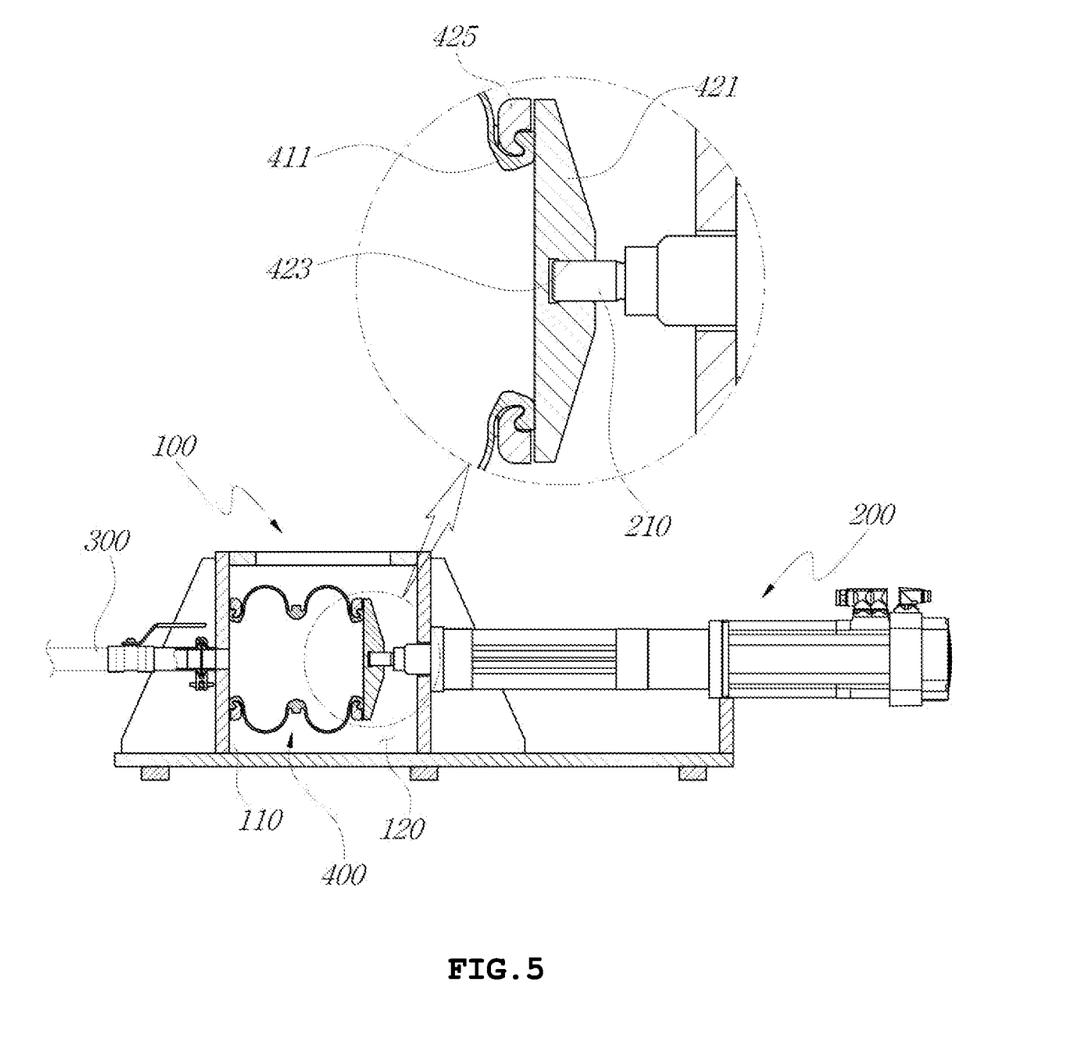
FIG. 5 is a cross-sectional view illustrating another embodiment of the volume control actuator including a non-contact cylinder according to the present disclosure.

FIGS. 1 and 2 illustrate an embodiment in which the volume control actuator including a non-contact cylinder is disposed in a vertical direction, whereas FIGS. 4 and 5 illustrate another embodiment in which the volume control actuator including a non-contact cylinder is disposed in a horizontal direction. The following description will be based on the state in which the volume control actuator is disposed in the vertical direction, but the volume control actuator disposed in the horizontal direction will have the same structure and operational relationship.

The installation frame 100 may have a predetermined height and a predetermined size and may be configured such that a first installation space 120 and a second installation space 130 are provided in the upper and lower portions, respectively. The installation frame 100 may be disposed on top of a table or a base.

The pressing unit 200 may be vertically disposed on top of the installation frame 100. The pressing unit 200 may move a reciprocating rod 210 in the first installation space 120 by reciprocating stroke movements.

Figure 6:
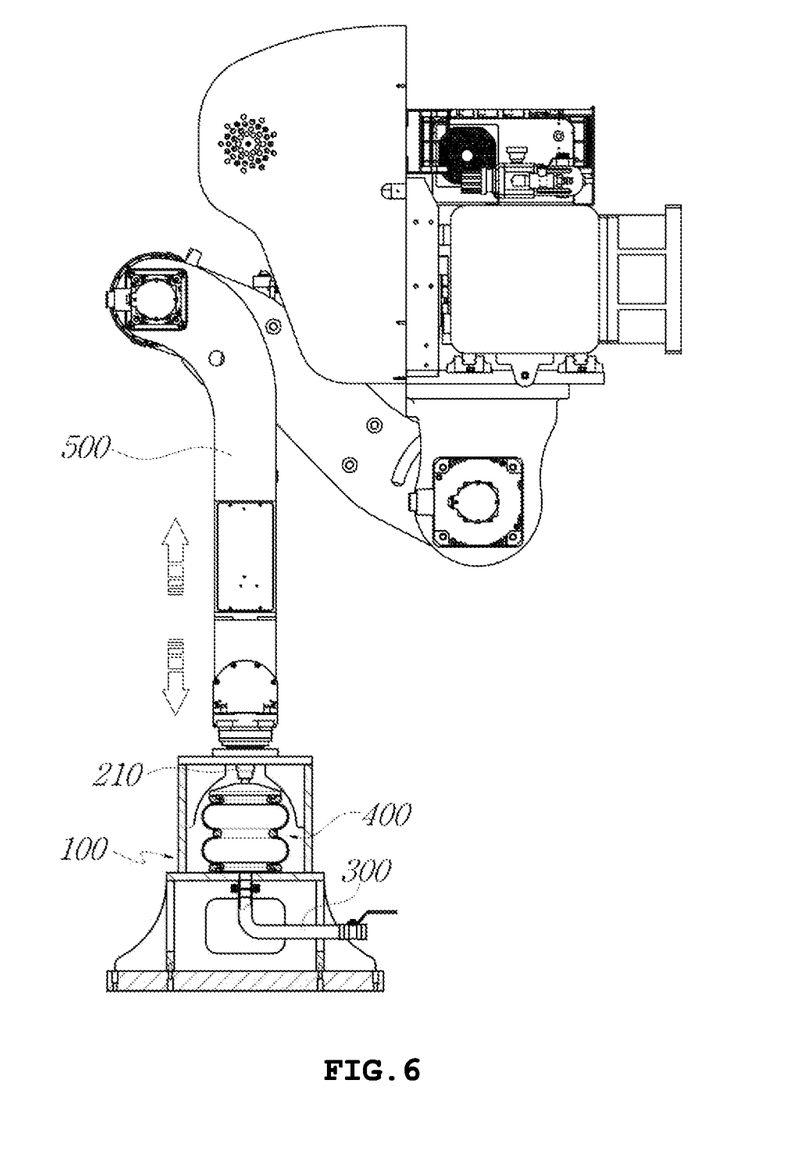
FIG. 6 is a cross-sectional view illustrating another embodiment of the volume control actuator including a non-contact cylinder according to the present disclosure.

Meanwhile, referring to FIG. 6, the pressing unit 200 may be implemented as a hydraulic or pneumatic cylinder configured to reciprocate linearly. A robot arm 500 may be provided in place of the cylinder to move the reciprocating rod 210 linearly reciprocating stroke movements.

The fluid pipe 300 may be provided in the second installation space 130. The fluid pipe 300 may be connected to an installation plate 110 to obtain a path through which fluid flows.

Both sides of the rubber cylinder 400 may be fixed to the top surface of the installation plate 110 and one end of the reciprocating rod 210. The rubber cylinder 400 may be provided in the first installation space 120 so as to change the volume thereof in an expanding and contracting manner in response to the stroking of the reciprocating rod 210, thereby causing fluid in the fluid pipe 300 to flow.

Figure 3:
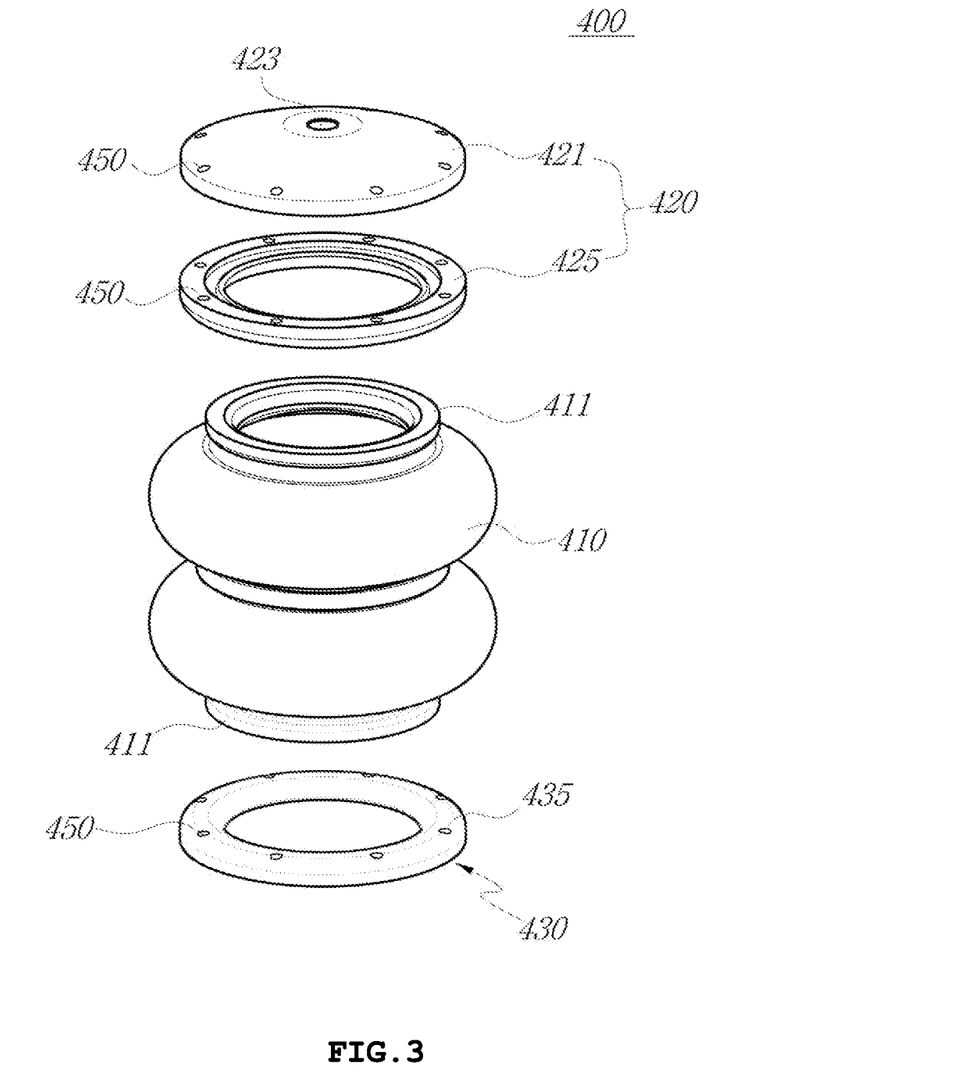
FIG. 3 is an exploded view illustrating the rubber cylinder provided in the volume control actuator including a non-contact cylinder according to the present disclosure.

Here, the rubber cylinder 400 may include a bellows 410 and upper and lower joints 420 and 430.

The bellows 410 may be implemented as a tube formed of a rubber material to change the volume thereof in an expanding and contracting manner in response to the stroking of the reciprocating rod 210, thereby causing fluid in the fluid pipe 300 to flow.

The upper joint 420 may connect one end of the reciprocating rod 210 and the top end of the bellows 410 to transfer reciprocating movement of the reciprocating rod 210, which protrudes from and retracts into the pressing unit 200, to the bellows 410.

The lower joint 430 may connect the top surface of the installation plate 110 and the bottom end of the bellows 410, thereby fixing the bottom end of the bellows 410 to the installation plate 110.

The upper joint 420 may include a connecting plate 421 and an upper coupling ring 425.

The connecting plate 421 is in the shape of a disk, and has a fastening socket 423 and a plurality of fastening holes 450. The fastening socket 423 is formed in the central portion of the connecting plate 421 to be fastened to the bottom end of the reciprocating rod 210. The fastening holes 450 are formed in the peripheral portion of the connecting plate 421 to be flange-coupled by fastening members 440.

The upper coupling ring 425 may have a plurality of fastening holes 450 corresponding to the fastening holes 450 of the connecting plate 421 to tightly hold a flange 411 formed on the top end of the bellows 410.

Thus, due to the fastening members 440 extending through and fastened to the fastening holes 450, the upper coupling ring 425 is in tight contact with and integrally fixes the flange 411 of the bellows 410.

Meanwhile, the lower joint 430 may have the plurality of fastening holes 450 formed around the fluid pipe 300 connected to the installation plate 110 to be flange-coupled by the fastening members 440. The lower joint 430 may be implemented as a lower coupling ring 435 configured to tightly hold a flange 411 therein, the flange 411 being provided on the bottom end of the bellows 410. Due to the fastening members 440 extending through and fastened to the fastening holes 450, the lower coupling ring 435 may be in tight contact with and integrally coupled to the flange 411 of the bellows 410.

In addition, a check valve may further be provided on the installation plate 110 to allow fluid to flow in a single direction through the fluid pipe 300.

In addition, the connecting plate 421 may further be provided with an air vent configured to discharge compressed air from inside the rubber cylinder 400 in the event of an emergency.

Due to the present disclosure having the above-described configuration, pumping may be performed by changes in volume without contact resistance, thereby improving durability of a product and increasing longevity thereof.

The terms and words used in the specification and the appended claims should not be interpreted as having ordinary or dictionary meanings, but as meanings and concepts conforming to the technical spirit of the present disclosure, based on the principle that an inventor may properly define the concept of the terms at his/her own discretion in order to describe the present disclosure in the best manner possible.

Therefore, since the exemplary embodiments described herein and the configurations illustrated in drawings are merely the most preferred embodiments of the present disclosure and are not intended to limit all technical concepts of the present disclosure, it should be understood that there may be variations, equivalents or modifications capable of replacing them at the time of filing of this application.

What is claimed is:

1. A volume control actuator including a non-contact cylinder, the volume control actuator comprising:
    an installation frame having a predetermined height and a predetermined size, with a first installation space and a second installation space being defined in an upper portion and a lower portion of the installation frame, respectively;
    a pressing cylinder vertically disposed on top of the installation frame to move a reciprocating rod in the first installation space by reciprocating stroke movements;
    a fluid pipe provided in the second installation space and connected to an installation plate to obtain a path through which fluid flows; and
    a rubber cylinder having both ends fixed to a top surface of the installation plate and one end of the reciprocating rod,
    wherein the rubber cylinder is provided in the first installation space so that the volume of the rubber cylinder changes in an expanding and contracting manner in response to the stroking of the reciprocating rod, thereby causing fluid in the fluid pipe to flow,
    wherein the rubber cylinder comprises:
        a bellows formed of a rubber material to change the volume thereof in an expanding and contracting manner in response to the stroking of the reciprocating rod, thereby causing fluid in the fluid pipe to flow;
        an upper joint connecting the end of the reciprocating rod and a top end of the bellows to transfer reciprocating movement of the reciprocating rod, which protrudes from and retracts into the pressing cylinder, to the bellows; and
        a lower joint connecting the top surface of the installation plate and a bottom end of the bellows, thereby fixing the bottom end of the bellows to the installation plate, and
    wherein the lower joint comprises:
        a plurality of fastening holes formed around the fluid pipe connected to the installation plate to be flange-coupled by the fastening members; and
        a lower coupling ring configured to tightly hold a flange therein, the flange being provided on the bottom end of the bellows, wherein the lower coupling ring is in tight contact with and integrally coupled to the flange of the bellows by the fastening members extending through and fastened to the fastening holes.

2. The volume control actuator of claim 1, wherein the upper joint comprises:
    a disk-shaped connecting plate comprising a fastening socket formed in a central portion of the connecting plate to be fastened to the end of the reciprocating rod and a plurality of fastening holes formed in a peripheral portion of the connecting plate to be flange-coupled by fastening members; and an upper coupling ring having a plurality of fastening holes corresponding to the fastening holes of the connecting plate to tightly hold a flange formed on the top end of the bellows, wherein the lower coupling ring is in tight contact with and integrally coupled to the flange of the bellows by the fastening members extending through and fastened to the fastening holes.

3. The volume control actuator of claim 1, wherein the installation plate further comprises a check valve by which fluid is allowed to flow in a single direction through the fluid pipe.

4. A volume control actuator including a non-contact cylinder, the volume control actuator comprising:

an installation frame having a predetermined height and a predetermined size and a first installation space and a second installation space defined in upper and lower portions, respectively;

a robot arm having one end connected to a top portion of the installation frame to move a reciprocating rod in the first installation space reciprocating stroke movements;

a fluid pipe provided in the second installation space and connected to an installation plate to obtain a path through which fluid flows; and a rubber cylinder having both ends fixed to a top surface of the installation plate and one end of the reciprocating rod, wherein the rubber cylinder is provided in the first installation space so that the volume of the rubber cylinder changes in an expanding and contracting manner in response to the stroking of the reciprocating rod, thereby causing fluid in the fluid pipe to flow, wherein the rubber cylinder comprises:

a bellows formed of a rubber material to change the volume thereof in an expanding and contracting manner in response to the stroking of the reciprocating rod, thereby causing fluid in the fluid pipe to flow;

an upper joint connecting the end of the reciprocating rod and a top end of the bellows to transfer reciprocating movement of the reciprocating rod, which protrudes from and retracts into the pressing cylinder, to the bellows; and a lower joint connecting the top surface of the installation plate and a bottom end of the bellows, thereby fixing the bottom end of the bellows to the installation plate, and wherein the lower joint comprises:

a plurality of fastening holes formed around the fluid pipe connected to the installation plate to be flange-coupled by the fastening members; and a lower coupling ring configured to tightly hold a flange therein, the flange being provided on the bottom end of the bellows, wherein the lower coupling ring is in tight contact with and integrally coupled to the flange of the bellows by the fastening members extending through and fastened to the fastening holes.

5. The volume control actuator of claim 4, wherein the upper joint comprises:

a disk-shaped connecting plate comprising a fastening socket formed in a central portion of the connecting plate to be fastened to the end of the reciprocating rod and a plurality of fastening holes formed in a peripheral portion of the connecting plate to be flange-coupled by fastening members; and an upper coupling ring having a plurality of fastening holes corresponding to the fastening holes of the connecting plate to tightly hold a flange formed on the top end of the bellows, wherein the lower coupling ring is in tight contact with and integrally coupled to the flange of the bellows by the fastening members extending through and fastened to the fastening holes.

6. The volume control actuator of claim 4, wherein the installation plate further comprises a check valve by which fluid is allowed to flow in a single direction through the fluid pipe.

* * * * *